United States Patent [19]

Elder

[11] Patent Number: 5,273,010
[45] Date of Patent: Dec. 28, 1993

[54] INTAKE MANIFOLD

[75] Inventor: Jack E. Elder, Rochester, Mich.

[73] Assignee: General Motors Corporation, Detroit, Mich.

[21] Appl. No.: 937,485

[22] Filed: Aug. 28, 1992

[51] Int. Cl.$^5$ ............................................. F02M 35/00
[52] U.S. Cl. ........................... 123/52 M; 123/52 MV; 123/52 MC
[58] Field of Search ......... 123/52 M, 52 MC, 52 MV

[56] References Cited

U.S. PATENT DOCUMENTS

| 2,845,911 | 8/1958 | Gill | 123/52 MV |
| 4,341,186 | 7/1982 | Mayr et al. | 123/52 M |
| 4,440,120 | 4/1984 | Butler | 123/52 MV |
| 4,497,287 | 2/1985 | Schleiermacher et al. | 123/52 M |
| 4,515,115 | 5/1985 | Okubo | 123/52 M |
| 4,643,138 | 2/1987 | Ruf et al. | 123/52 M |
| 4,649,871 | 3/1987 | Hatamura et al. | 123/52 MV |
| 4,719,879 | 1/1988 | Kato et al. | 123/52 M |
| 4,776,313 | 10/1988 | Freismuth et al. | 123/470 |
| 4,784,091 | 11/1988 | Okada et al. | 123/52 MV |
| 4,805,564 | 2/1989 | Hudson, Jr. | 123/52 MC |
| 4,829,942 | 5/1989 | Ampferer | 123/52 MV |
| 4,867,110 | 9/1989 | Distelrath | 123/52 MC |
| 5,003,933 | 4/1991 | Rush, II et al. | 123/52 MC |
| 5,063,885 | 11/1991 | Yoshioka | 123/52 MV |
| 5,094,194 | 3/1992 | Rush et al. | 123/52 MC |
| 5,165,117 | 10/1992 | Muller et al. | 123/52 MV |

OTHER PUBLICATIONS

Cadillac Rolls Out New DOHC V-8 in '93 Allante, WARD's Engine and Vehicle Technology Update, Jan. 15, 1992, p. 4.
John McElroy, Cadillac's Northstar V8, Automotive Industries, Jan. 1992, pp. 28-31.

Primary Examiner—Tony M. Argenbright
Assistant Examiner—M. Macy
Attorney, Agent, or Firm—Charles K. Veenstra

[57] ABSTRACT

A one-piece integrally molded intake manifold is for an engine having opposed cylinders. The intake manifold comprises a plurality of runners each of which is coiled about a runner center. The runners are arranged side-by-side so that the runner centers lie on a common manifold axis. Adjacent ones of the runners are oppositely curved and interdigitated with one another so that a generally cylindrical plenum is defined by the space around which the runners are coiled. Each of the runners includes a runner inlet and upper and side runner surfaces adjoining the runner inlet. The portion of the upper and side runner surfaces adjoining the runner inlet are outwardly flared so that the cross section of the runner decreases from the runner inlet into the runner. The intersections between the upper and side runner surfaces are rounded. Air in the plenum can flow through the flared runner inlets into the runners. The runners direct the air therein to flow in curved paths of opposite sense to cylinder inlet ports of the opposed cylinders. The one-piece intake manifold is integrally molded by a method and apparatus including cores having flared inlet and side surfaces, bell-mouth recesses, and arcuate runner ears and ear recesses.

3 Claims, 2 Drawing Sheets

INTAKE MANIFOLD

TECHNICAL FIELD

This invention relates to a molded integral one-piece intake manifold for an engine, and more particularly, to such an intake manifold wherein the runner inlets have flared edges and the outer longitudinal edges of the runners, which adjoin the plenum, are rounded.

BACKGROUND

An intake manifold for an engine can have a molded integral one-piece construction. It can be desirable for such an intake manifold to include coiled runners which are arranged side-by-side and oppositely curved so that a generally cylindrical plenum is defined by the space around which the runners are coiled. When molding such an intake manifold, it can be difficult to form the runner inlets with flared edges and to form the outer longitudinal edges of the runners, which adjoin the plenum, in a rounded shape. It is a well-known advantage for air inlets of intake manifolds to have a "bellmouth" or flared entrance. This converging nozzle principle enhances the flow of air into any tube end.

It is known to form plastic intake manifolds for V-type engines by using a "lost core" molding process wherein the plastic manifold is formed around multiple cores which are subsequently melted within the intake manifold and drained from it. A separate plastic "bellmouth" (i.e., a runner inlet which is outwardly flared) is attached by snaps and/or glue to the entrance of each individual runner. Such a manifold can require a plenum having a substantial size to enable attachment of the "bellmouths" to the runners. The size of such a plenum typically must be reduced by inserting a displacement member or mechanism therein. This can result in increased complexity and cost of the intake manifold and the method of making it, and in reduced durability of the intake manifold.

SUMMARY OF THE INVENTION

The present invention provides a one-piece integrally molded intake manifold for an engine having opposed cylinders. The intake manifold comprises a plurality of runners each of which is coiled about a runner center. The runners are arranged side-by-side so that the runner centers lie on a common manifold axis. Adjacent ones of the runners are oppositely curved and interdigitated with one another so that a generally cylindrical plenum is defined by the space around which the runners are coiled. Each of the runners has a runner inlet and upper and side runner surfaces adjoining the runner inlet. A portion of the upper and side runner surfaces adjoining the runner inlet are outwardly flared so that the cross section of the runner decreases from the runner inlet into the runner. The intersections of the upper and side runner surfaces are rounded. Air in the plenum can flow through the flared runner inlets into the runners. The runners direct the air therein to flow in curved paths of opposite sense to cylinder inlet ports of the opposed cylinders. The present invention also provides an apparatus and method for integrally molding the intake manifold, including cores having flared inlet and side surfaces, bell-mouth recesses, and arcuate runner ears and ear recesses.

The rounding of the intersections of the upper and side runner surfaces, and the flared runner inlets facilitate air flow through the plenum and into the runners, respectively. Sharp edges between the intersections of the upper and side runner surfaces can result in the formation of eddies in the air flows by them which interfere which the air flow through the plenum.

The present invention also provides an apparatus and method for integrally molding the intake manifold wherein the apparatus and method includes cores having flared inlet and side surfaces, bell-mouth recesses, and arcuate runner ears and ear recesses.

These and other features and advantages of the invention will be more fully understood from the following description of certain specific embodiments of the invention taken together with the accompanying drawings.

BRIEF DRAWING DESCRIPTION

In the drawings:

FIG. 3 is a view showing a core of the apparatus of this invention enclosed by the casing mold, and showing plastic in the spaces between the core and casing mold.

Corresponding reference characters indicate corresponding parts throughout the several views of the drawings.

DETAILED DESCRIPTION

Figure 1:
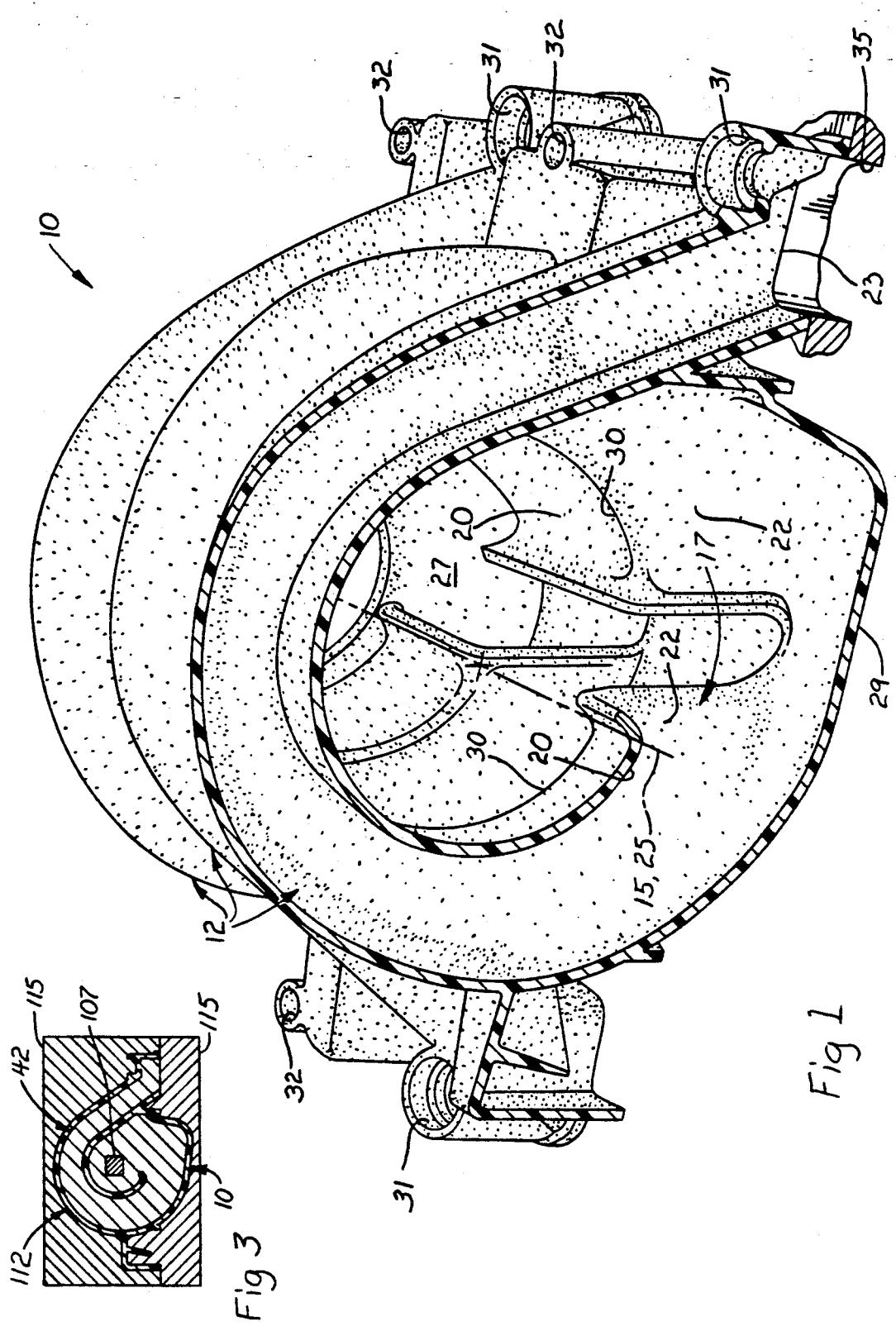
FIG. 1 is a perspective view of the one-piece integrally molded intake manifold of the present invention.

Referring to the drawings, and in particular, FIG. 1, numeral 10 generally refers to a one-piece integrally molded intake manifold 10 for an engine having opposed cylinders. The intake manifold 10 is formed of 30% glass-filled polyamide 66 plastic. The intake manifold 10 may be formed of other plastics, as well. The intake manifold 10 comprises a plurality of runners 12 with each runner 12 being coiled about a runner center 15. Each runner has a runner inlet and outlet 17, 23. The cross section of each runner 12 is D-shaped between the runner inlet 17 and the region containing the top of each runner. The portion of the runner adjoining the runner inlet 17 has upper and side runner surfaces 20, 22. The intersections 30 between the upper and side runner surfaces 20, 22 are rounded. The portions of the upper and side runner surfaces 20, 22 which adjoin the runner inlet 17 are outwardly flared so that the cross section of said runner 12 decreases from the runner inlet into the runner. In the region containing the top of each runner 12, the cross section of each runner changes to rectangular which extends to the runner outlet 23.

The runners 12 are arranged side-by-side so that the runner centers 15 lie on a common manifold axis 25. Adjacent runners 12 are oppositely curved and interdigitated with one another so that a generally cylindrical plenum 27 is defined by the space around which the runners are coiled. The adjacent runner inlets 17 face one another and are spaced apart from one another in the direction they face.

The intake manifold 10 has an arcuate integral bottom wall section 29 extending circumferentially between the runner inlet 17 and underside of the runner adjacent to the runner outlet 23. The intake manifold 10 also has side walls integrally formed with the sides of the runners 12 at the ends of the side-by-side runner arrangement. The bottom wall sections 29 and side walls complete the enclosure which defines the plenum 27. One of the side walls has an intake opening enabling air to flow into the plenum 27.

An injector support is integrally molded with the outer surface of each runner 12 adjacent to the runner outlet 23. Each injector support has a vertical stepped injector bore 31 adapted to support the lower end of a fuel injector. A bolt shoulder is integrally molded with the portion of the outer surface of each of runner 12 between the injector supports. Each bolt shoulder has a vertical bolt bore 32 through which a bolt extends to secure the intake manifold 10 to the cylinder heads of the engine.

Air in the plenum 27 flows through the flared runner inlets 17 into the runners 12. The runners 12 direct the air therein to flow in curved paths of opposite sense to cylinder inlet ports 35 of the opposed cylinders. The fuel injectors mounted in the injector supports direct fuel into the air stream exiting the runner outlets 23.

APPARATUS

An apparatus 40 for molding the intake manifold 10 comprises a first core 42 having the shape of a ram's horn. The first core 42 is formed of a commercially available alloy comprised of tin, and one or more of the materials from the group consisting of bismuth, lead and antimony. The materials used in addition to lead depend on the plastic used for the intake manifold 10. The first core 42 may be formed of other similar commercially available metals, as well. The first core 42 comprises a cylindrical plenum form 45 having opposite plenum form sides 50. The plenum form 45 has a plenum form axis 47 which extends through the center of the plenum form and is inclined with respect to the plenum form sides 50. The plenum form 45 has a convex plenum form margin 52.

The first core 42 further comprises a spacer form 55 integrally formed with the plenum form 45. The spacer form 55 extends circumferentially from the plenum form 45 with respect to the plenum form axis 47. Each side of the spacer form 55 has a wedge-shaped bell-mouth recess 57. The bell-mouth recess 57 has a recess base 60 which extends away from the plenum form axis 47 in the radial direction and a recess side 61 which extends away from the recess base in a plane which is inclined with respect to the plenum form sides 50.

The first core 42 includes an arcuate inlet form 62 having an inlet form inlet 65 integral with the spacer form 55 and an inlet body 67. The inlet form 62 encircles part of the plenum form 45. The inlet form inlet 65 has outwardly flared inner and side surfaces 70, 72 with each of the flared side surfaces adjoining one of the bell-mouth recesses 57 opposite from the recess base 60.

The inlet body 67 has a concave inlet body interior 75 facing the plenum form margin 52. The space between the plenum form margin 52 and inlet body interior 75 in the radial direction from the plenum form axis 47 is constant in a direction which is parallel to the plenum form axis 47. The inlet form 62 has an inlet form outlet 77 opposite from the inlet form inlet 65.

The first core 42 further comprises an arcuate ear recess 80 integrally formed in each side of the plenum form 45. Each of the ear recesses 80 has one end adjacent to the inlet form inlet 65 and circumferentially extends toward the inlet form outlet 77. Each of the ear recesses adjoins the plenum form margin 52.

The first core 42 includes an arcuate runner ear 82 integrally formed in each side of the spacer form 55. Each of the runner ears 82 has an ear base 85 adjoining the spacer form 55 and tangent to the side thereof. Each of the runner ears 82 has a concave ear surface 87 and an ear end 90 opposite from the ear base 85. This facilitates formation of the first core 42 by molding since the thickness of the runner ear 82 decreases in a direction which is parallel to the plenum form axis 47 enabling removal of molds from the first core.

The first core 42 comprises an outlet form 92 having an outlet form inlet 95 integral with the inlet form outlet 77. The outlet form 92 is disposed so that the spacer form 55 is between the outlet and inlet forms 92, 62. The outlet form 92 has a concave outlet form interior 97 facing the plenum form margin 52, and has a larger radius of curvature than the plenum form margin 52. The space between the plenum form margin 52 and outlet form interior 97 in the radial direction is constant in the direction which is parallel to the plenum form axis 47.

The outlet form 92 has an outlet form outlet 100 opposite from the outlet form inlet 95. The portion of the outlet form 92 adjoining the outlet form outlet 100 forms a small angle with a plane which is parallel to the plenum form sides 50.

The outlet form 92 has an integral injector boss on its outer surface adjoining the outlet form outlet 100. The injector boss forms a V-shape with the outlet form 92. Formed in each injector boss is a blind socket on an axis which is perpendicular to the outlet form outlet 100 and opens from the side of the injector boss opposite from the outlet form outlet.

The apparatus 40 includes an assembling means 102 comprising a non-circular center bore 105 coaxial with the plenum form axis 47. The assembling means 102 further comprises a shaft 107 having a cross section with the same shape as and a smaller area than the center bore 105 so that the shaft can be inserted through the center bore 105.

METHOD

Figure 2:
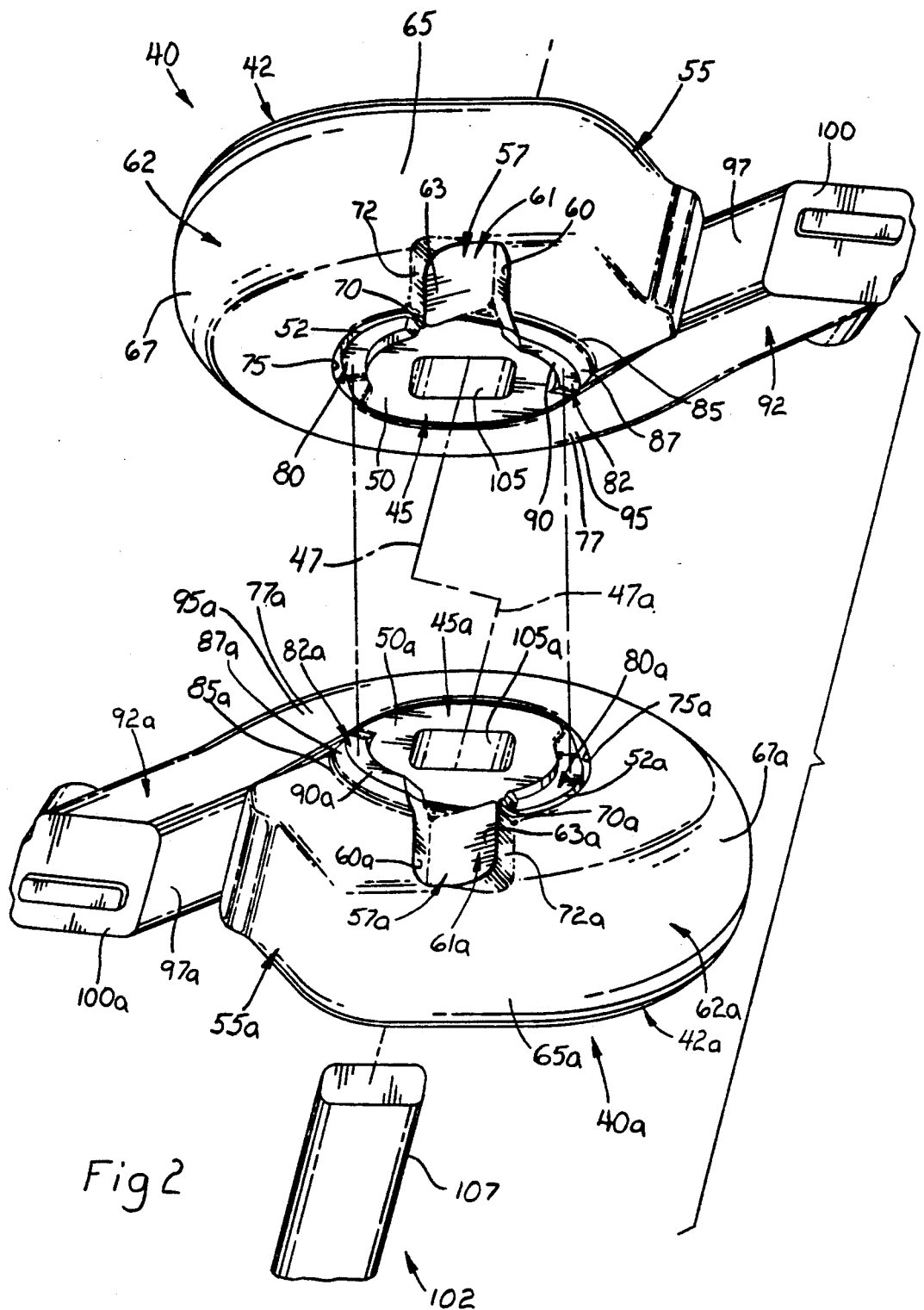
FIG. 2 is a perspective view of the apparatus for integrally molding the intake manifold of FIG. 1.

A method for molding the intake manifold 10 comprises placing the first core 42 against a second core 42a, as shown in FIG. 2. The second core 42a has the same shape as the first core 42 with parts of the second core similar to those of the first core having the same reference numeral with the addition of the suffix a. The second core 42a is also formed of the same material as the first core 42.

The first core 42 is placed against the second core 42a so that a side of the plenum form 45 adjoins and is flush with a side of the plenum form 45a. The inlet form inlet 65 faces the opposite direction from the inlet form inlet 65a, and the plenum form axis 47 is coaxial with the plenum form axis 47a. The inlet and outlet forms 62, 92 are spaced from the second core 42a in the direction of the plenum form axis 47, and one of the flared side surfaces 72 is inserted into a bell-mouth recess 57a so that the flared side surface is spaced from the recess base 60a. Portions of the recess sides 61, 61a which are spaced apart from the recess bases 60, 60a adjoin and are flush with one another. One of the runner ears 82 is inserted into an ear recess 80a so that the ear surface 87 adjoining the ear end 90 is tangent to the plenum form margin 52a.

The first core 42 is held to the second core 42a by inserting the shaft 107 through the center bores 105, 105a. Additional cores may be added to the shaft 107 in a staggered arrangement wherein adjacent inlet forms (e.g., 62, 62a) curve in opposite directions. The intake manifold 10 will have a runner 12 corresponding to each core 42, 42a. References to the first and second cores 42, 42a in the remainder of this "Method" section include any such additional cores.

When the shaft 107 is inserted through three or more cores 42, 42a, the outlet form outlets 100 on adjoining cores are closer together than the outlet form outlets on every other core. This is due to the inclination of the portions of the outlet forms 92, 92a adjoining the outlet form outlets 100, 100a with respect to a plane which is parallel to the plenum form sides 50.

The first and second cores 42, 42a are then enclosed by a casing mold 115 having an interior which has generally the same shape as the outer surface of the first and second cores. The upper half of the casing mold 115 has a series of pin holes each of which coaxially aligns with a separate blind socket in each injector boss. A pin is inserted through each pin hole into a separate blind socket and is axially loaded by a hydraulic cylinder to press the injector bosses against the interior of the casing mold 115.

The casing mold 115 is sized so that a space exists between the casing mold, and the first and second cores 42, 42a. The casing mold 115 has a melting temperature which is greater than the melting temperature of the first and second cores. The first and second cores 42, 42a inside the casing mold 115 are then axially compressed by a hydraulic press so that the surfaces of the first and second cores which adjoin and are flush with one another are sealed.

The intake manifold 10 is formed of plastic (e.g., 30% glass-filled polyamide 66 plastic, described above) having a melting temperature which is greater than the melting temperature of the first and second cores 42, 42a. Such a plastic, in a molten state, is injected into the space between the casing mold 115, and the first and second cores 42, 42a. The amount of heat contained in the molten plastic is less than the amount required to melt more than a nominal amount of the first and second cores 42, 42a. This is due primarily to the much smaller mass of the molten plastic injected into the casing mold 115, as compared to the first and second cores 42, 42a. Thus, no more than the outer skin of the first and second cores 42, 42a is melted.

More specifically, the casing mold 115 has two gates adjoining the outer surface of each outlet form 92, 92a with each gate having the approximate elevation of the injector bosses. In a casing mold 115 which contains eight cores 42, each group of four gates at each end and each side of the mold are connected by passages which branch from a single source of the molten plastic. Each passage leading to a gate has a valve to enable individual control of the plastic flow to the gates.

The molten plastic flows into the spaces between the outer surfaces of the inlet and outlet forms 62, 62a, 92, 92a and the casing mold 115 to form the outer circumferential walls of the runners 12. The molten plastic flows into cavities in the casing mold 115 adjoining the outer circumferential surface of some of the inlet forms 62 to form the bolt shoulders having the bolt bores 32. The molten plastic flows into the space between the casing mold 115 and the injector boss to form the injector support having the injector bore 30.

The molten plastic also flows into the space between the casing mold 115 and the sides of the first and second cores 42, 42a which define the ends of the stacked cores to form the side walls of the intake manifold 10. The molten plastic also flows into the spaces between the casing mold 115 and the outer circumferential surface of the spacer forms 55 to form the bottom wall sections 29.

The molten plastic flows into the spaces between the sides of the inlet and outlet forms 62, 92 and the second core 42a to form the side walls which are disposed between the runners 12. In those regions where the outlet form 92 faces the inlet form 62a, the adjacent runners 12 share a common side wall. The molten plastic flows into spaces between the flared side surface 72 and recess base 60a to form a flared side runner surface 22 of the runner inlet 17. The molten plastic also flows into the space between the flared side surface 72a and recess base 60 to form a flared side runner surface 22 of the runner inlet 17 of the adjacent runner 12.

The molten plastic flows into the space between the plenum form margin 52, 52a and the inlet body interior 75, 75a to form the interior wall of the runners 12. The molten plastic flows to the flared inner surface 70, 70a to form the flared upper runner surface 20 of the runner inlets 17. The molten plastic also flows into the space between the plenum form margin 52, 52a and ear surfaces 87, 87a to form the rounded intersections 30 between the upper and side runner surfaces 20, 22.

The spaces between the first and second cores 42, 42a, and between the first and second cores and casing mold 115 into which the molten plastic flows is 3 millimeters (mm) so that the walls of the intake manifold 10 are 3 mm thick. It is preferable for the type of plastic used to form the intake manifold 10 to have a uniform thickness.

The seal between the sides of the plenum forms 45, 45a, and the ear ends 90, 90a and ear recesses 80a, 80 created by the hydraulic press obstructs the plastic flow between them enabling formation of the plenum 27. The seal, created by the hydraulic press, between the portions of the recess sides 61, 61a which are spaced apart from the recess bases 60, 60a obstructs the plastic flow between them causing the separation between the adjacent runner inlets 17 in the direction they face. The spacer forms 55, 55a obstruct the plastic flow enabling formation of the portion of the plenum 27 which the runner inlets 17 face.

The molten plastic in the above spaces is allowed to cool to a hardened state.

The casing mold 115, hardened plastic, first and second cores 42, 42a are heated to a temperature which is greater than the melting temperature of the first and second cores, and which is less than the melting temperature of the hardened plastic and casing mold 115 causing the first and second cores 42, 42a to melt. The molten first and second cores 42, 42a are then drained out of the casing mold 115. This step of melting the cores and draining them out of the casing mold 115 is similar to a step used in other "lost core" molding processes. The casing mold 115 is then removed from the hardened plastic.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

The embodiments of the invention in which an exclusive property or privilege is claimed are defined as follows:

1. A one-piece integrally molded intake manifold for an engine having opposed cylinders, said intake manifold comprising a plurality of runners each of which is coiled about a runner center, said runners being arranged side-by-side so that said runner centers lie on a common manifold axis, adjacent ones of said runners being oppositely curved and interdigitated with one another so that a generally cylindrical plenum is defined by the space around which said runners are coiled, each of said runners having a runner inlet and upper and side runner surfaces adjoining said runner inlet, a portion of said upper and side runner surfaces adjoining said runner inlet being outwardly flared to form a bell-mouth in which the cross section of said runner decreases from said runner inlet into said runner and facilitates air flow from said plenum through said flared runner inlets into said runners, the intersections between said upper and side runner surface being rounded to facilitate air flow through said runners, said runners directing the air therein to flow in curved paths of opposite sense to cylinder inlet ports of the opposed cylinders.

2. The one-piece molded intake manifold of claim 1, wherein said manifold is formed about a plurality of cores each having the shape of a ram's horn comprising:

a cylindrical plenum form having a plenum form axis, opposite plenum form sides, and a convex plenum form margin;

a spacer form integrally formed with said plenum form, said spacer form extending from said plenum form in a plane which is parallel to the plenum form sides, each side of said spacer form having a wedge-shaped bell-mouth recess wherein said bell-mouth recess has a recess base which extends away from said plenum form axis in said radial direction;

an arcuate inlet form having an inlet form inlet integral with said spacer form and an inlet body, said inlet form encircling part of said plenum form, said inlet form inlet having outwardly flared inner and side surfaces, each of said flared side surfaces adjoining one of said bell-mouth recesses opposite from said recess base, said inlet body having a concave inlet body interior facing said plenum form margin, the space between said plenum form margin and inlet body interior in a radial direction from said plenum form axis being constant in a direction which is parallel to said plenum form axis, said inlet form having an inlet form outlet opposite from said inlet form inlet;

an outlet form having an outlet form inlet integral with said inlet form outlet, said outlet form being disposed so that said spacer form is between said outlet and inlet forms, said outlet form having a concave outlet form interior facing said plenum form margin, said outlet form having a larger radius of curvature than said plenum form margin, the space between said plenum form margin and outlet form interior in said radial direction being constant in the direction of said plenum form axis, said outlet form having an outlet form outlet opposite from said outlet form inlet; and said cores being assembled in side-by-side relation so that a side of said plenum form of each core adjoins a side of the plenum form of the adjacent cores, said inlet form inlet of each core faces the opposite direction from the inlet form inlet of the adjacent cores, said plenum form axis of each core is coaxial with the plenum form axis of the other cores, said inlet and outlet forms of each core being axially spaced from the inlet and outlet forms of the other cores, and said flared side surfaces of each core are inserted into the bell-mouth recesses of the adjacent cores and said flared side surface of each core is spaced from the recess base of the other cores.

3. The one-piece integrally molded intake manifold of claim 1, wherein said manifold is formed about a plurality of cores each having the shape of a ram's horn comprising:

a cylindrical plenum form having a plenum form axis, opposite plenum form sides, and a convex plenum form margin;

a spacer form integrally formed with said plenum form, said spacer form extending from said plenum form in a plane which is parallel to the plenum form sides;

an arcuate inlet form having an inlet form inlet integral with said spacer form and an inlet body, said inlet form encircling part of said plenum form, said inlet body having a concave inlet body interior facing said plenum form margin, the space between said plenum form margin and inlet body interior in a radial direction from said plenum form axis being constant in a direction which is parallel to said plenum form axis, said inlet form having an inlet form outlet opposite from said inlet form inlet;

an arcuate ear recess integrally formed in each of the opposite sides of said plenum form, each of said ear recesses having one end adjacent to said inlet form inlet and extending toward said inlet form outlet wherein each of said ear recesses adjoins said plenum form margin;

an arcuate runner ear integrally formed in each of the opposite sides of said spacer form, each of said runner ears having an ear base adjoining said spacer form and tangent to the side thereof, each of said runner ears having a concave ear surface and an ear end opposite form said ear base;

an outlet form having an outlet form inlet integral with said inlet form outlet, said outlet form being disposed so that said spacer form is between said outlet and inlet forms, said outlet form having a concave outlet form interior facing said plenum form margin, said outlet form having a larger radius of curvature than said plenum form margin, the space between said plenum form margin and outlet form interior in said radial direction being constant in the direction of said plenum form axis, said outlet form having an outlet form outlet opposite from said outlet form inlet; and said cores being assembled in a side-by-side relation so that a side of said plenum form of each core adjoins and is flush with a side of the plenum for of adjacent cores, said inlet form inlet of each core faces the opposite direction from the inlet form inlet of the adjacent cores, said plenum form axis of each core is coaxial with the plenum form axis of the other cores, said inlet and outlet forms of each core being axially spaced from the inlet and outlet forms of the other cores; and said runner ears of each core are inserted into ear recesses of the adjacent cores so that an ear surface adjoining said ear end of each core is tangent to the plenum form margin of the adjacent cores.

* * * * *